United States Patent [19]
Kalvinskas et al.

[11] 3,994,804
[45] Nov. 30, 1976

[54] SEWAGE SLUDGE TREATMENT SYSTEM

[75] Inventors: John J. Kalvinskas, S. Pasadena; William A. Mueller, Glendale, both of Calif.

[73] Assignee: California Institute of Technology, Pasadena, Calif.

[22] Filed: Jan. 16, 1976

[21] Appl. No.: 649,641

[52] U.S. Cl. .................................. 210/27; 210/40; 210/67; 210/73 S; 210/259
[51] Int. Cl.² .................. B01D 15/06; B01D 37/00
[58] Field of Search ............... 210/5, 18, 27, 40, 67, 210/30 R, 73 SG, 259, 195 S, 195 SO, 197

[56] References Cited
UNITED STATES PATENTS

| | | | |
|---|---|---|---|
| 1,915,240 | 6/1933 | Putnam | 210/6 |
| 2,209,613 | 7/1940 | Roeder | 210/6 |
| 3,622,509 | 11/1971 | Shaler | 210/32 |
| 3,637,487 | 1/1972 | Kemmer et al. | 210/18 X |

Primary Examiner—Frank A. Spear, Jr.
Assistant Examiner—Ethel R. Cross
Attorney, Agent, or Firm—Lindenberg, Freilich, Wasserman, Rosen & Fernandez

[57] ABSTRACT

Raw sewage may be presently treated by mixing screened raw sewage with activated carbon. The mixture is then allowed to stand in a first tank for a period required to settle the suspended matter to the bottom of the tank as a sludge. Thereafter, the remaining liquid is again mixed with activated carbon and the mixture is transferred to a secondary settling tank, where it is permitted to stand for a period required for the remaining floating material to settle as sludge and for adsorption of sewage carbon as well as other impurities to take place. The sludge from the bottom of both tanks is removed and pyrolyzed to form activated carbon and ash, which is mixed with the incoming raw sewage and also mixed with the liquid being transferred from the primary to the secondary settling tank. It has been found that the output obtained by the pyrolysis process contains an excess amount of ash. Removal of this excess amount of ash usually also results in removing an excess amount of carbon thereby requiring adding carbon to maintain the treatment process. By separately pyrolyzing the respective sludges from the first and second settling tanks, and returning the separately obtained pyrolyzed material to the respective first and second tanks from which they came, it has been found that the adverse effects of the excessive ash buildup is minimized, the carbon yield is increased, and the sludge from the secondary tank can be pyrolyzed into activated carbon to be used as indicated many more times than was done before exhaustion occurs.

4 Claims, 1 Drawing Figure

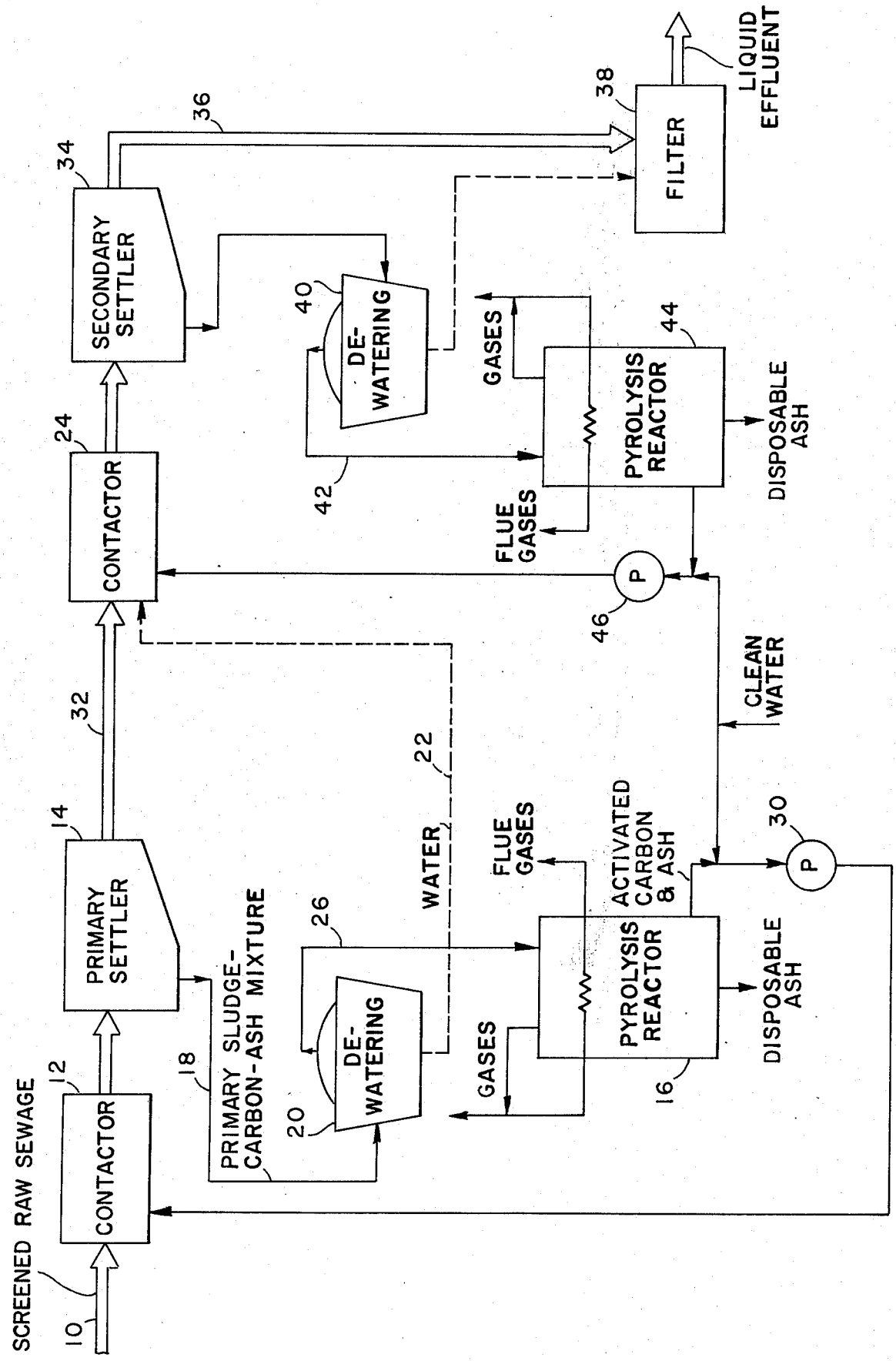

SEWAGE SLUDGE TREATMENT SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to an improved method and means in the processing of raw liquid sewage which contains suspended matter therein.

One typical treatment for raw sewage, consisting of water contaminated by organic and inorganic matter which is dissolved in the matter as well as organic and inorganic matter which is not dissolved but is suspended, is to mix the sewage after screening with activated carbon and then dump the mixture into a primary settling tank, to permit the activated carbon to adsorb the dissolved pollutants and also to assist in settling the suspended matter to the bottom of the tank as sludge. Thereafter, the liquid contents of the primary settling tank are again mixed with the activated carbon and then placed in a second settling tank for further adsorption of dissolved pollutants and settling of suspended matter to the bottom of the tank to form a second sludge. The contents of the second tank may then be filtered to catch any fine suspended matter such as fine charcoal particles, and the water may then be returned to a stream or to the ocean.

The sludge which settles to the bottom of the first and second settling tanks can be treated to be converted into something useful. One technique is to de-water the sludges to form sludge cakes which are then pyrolyzed to form activated carbon and ash. This activated carbon and ash may then be used to supplement the carbon otherwise required to be added.

It has been found that the ash content of the material coming out of the pyrolyzer is quite high, as much as 75%. This consists primarily of sand and clay that comes in with the raw sewage. This excessive ash constitutes a bulk which interferes with the effective adsorption of the dissolved solids and damages the ability of the carbon to meet the Biological Oxygen Demand (BOD) standards that are set forth for the sewage effluent. Also, the mixture of the ash and carbon makes the ash difficult to separate from the carbon. Thus the necessary removal of ash to reduce its amount also results in the removal of a proportionate amount of carbon whereby the yield of carbon is reduced. To supply enough carbon and to keep down the need for supplemental commercial carbon it may be necessary to recycle the material a greater number of times. Unfortunately this results in a higher yield of ash.

OBJECTS AND SUMMARY OF THE INVENTION

An object of this invention is to reduce the ash build up in the recycled carbon and ash, in a process of the type mentioned.

Another object of this invention is to reduce the effects of ash build up in a sewage treatment plant of the type which has been described above.

Yet another object of the invention is to increase the activated carbon yield obtainable in a process of the type described above.

The foregoing and other objects of the invention may be achieved in an arrangement wherein the sludge from the primary settling tank is not mixed with secondary tank sludge but is separately pyrolyzed, and the resulting activated carbon and ash is mixed with the incoming raw sewage which is then pumped into the primary settling tank. The sludge from the secondary settling tank is separately pyrolyzed to form activated carbon and ash which is then mixed with the effluent from the primary settling tank and then pumped into the secondary settling tank. Thus the sludge from each tank is separately pyrolyzed and returned thereafter from the tank from which it originated.

The novel features of the invention are set forth with particularity in the appended claims. The invention will best be understood from the following description when read in conjunction with the accompanying drawing which is a block diagram of a sewage treatment plant which includes the improvement provided by this invention.

DESCRIPTION OF THE PREFERRED EMBODIMENTS

It has been found that excess ash forming material, namely sand and clay comes in with the raw sewage. There is little ash carryover from the effluent transferred from the primary settling tank to the secondary settling tank. Thus there is very little ash buildup in the pyrolyzed sludge from the secondary settling tank. Thus, the high quality of carbon in the secondary settling tank may be preserved if the secondary tank sludge is maintained isolated from the primary tank sludge. This is important since the adsorption qualities of the carbon are asserted in the secondary settling tank and are relatively unimportant in the primary treatment stage. The loss of carbon and purging ash from the pyrolyzed output of the primary settling tank is relatively unimportant, since in the primary settling tank it is of greater importance to settle the suspended matter and the high ash content of the carbon is of great assistance in this regard.

Referring now to the drawing, in accordance with this invention, raw sewage is first screened by appropriate means, (not shown) in a manner well known in the art, to remove all relatively large objects as well as much of the sand as possible under the circumstances. The sewage is then fed through a line 10, to a contactor 12, wherein it is mixed with a slurry of activated carbon and ash. After appropriate mixing, the mixture of the screened sewage with the slurry fed to the primary settling tank or primary settler 14.

The mixture in the primary settler is allowed to stand to permit settling of suspended matter which can be settled. The settleable matter, together with the carbon and ash slurry drops to the bottom of the primary settler in the form of a primary sludge. This sludge is transferred over a line 18, to a de-watering filter 20. The sludge is very wet, and that is the reason it is transferred to the de-watering filter which removes substantially most of the water, which is transferred over a line 22 to a second contactor 24.

The output of the de-watering filter 20, consisting of sludge cakes are substantially dry, are transferred over a line 26, to a pyrolysis reactor 16.

The pyrolysis reactor, which is supplied with the relatively dried cakes of the sludge, under controlled temperature and pressure conditions converts this into the activated material consisting of activated carbon and ash. As a part of the pyrolysis operation, various gases including combustible gases, such as methane and carbon may be released. Such gases may be used to provide at least part of the energy needed for the system's operation. The activated carbon and ash output from the pyrolysis reactor is then mixed with clean water from a source to form a slurry. This slurry is then transferred, by means of a pump 30, back to the contactor 10, to be mixed with the incoming sewage.

The effluent from the primary settler is pumped over a line 32 into the contactor 24. Here it is again mixed with activated carbon and ash and the mixture is then transferred to a secondary settler 34. The mixture is permitted to stand in the secondary settler for a suitable period of time to permit adsorption of the dissolved impurities by the carbon as well as settling of any remaining suspended settleable material to the bottom of the tank, to where it forms a secondary sludge. The effluent from the secondary settler is then pumped over a line 36 to a filter 38, where any fine suspended material which did not settle may be removed. The liquid output from the filter 38 may then be returned to streams or to the ocean.

The secondary sludge from the secondary settler is transferred to a de-watering filter 40. The liquid output of the de-watering filter may be transferred to the filter 38. The practically dry cakes of secondary slurry are transferred over a line 42, to a second pyrolyzer 44. The second pyrolyzer pyrolyzes the secondary sludge to provide activated carbon and ash, which has a very much lower ash content than the output of the pyrolyzer 16. The output of pyrolyzer 44 is then mixed with clean water to form a slurry. Thereafter it is pumped, by pump 46, back to the contactor 24, to be mixed with the effluent from the primary settler 14.

The recycled carbon and ash from the pyrolyzer 16, which has a much higher percentage of ash (70–80%) present than the output of the pyrolyzer 44, serves principally as a filter aid, assists in settling solids and provides some adsorption of the dissolved impurities. Primarily, the purpose of the primary settler is to remove the suspended material from the screened sewage, and therefore the quality of the carbon in this stage is relatively unimportant. That is, the requirements of the activated carbon for use in filtering and settling are much less stringent than imposed by the need to adsorb solids, which is the function of the secondary treatment cycle. Also, the loss of carbon in purging the ash from the pyrolyzer 16 is relatively unimportant and there is substantially little requirement to add more carbon to overcome this loss. Also, process flexibility can be enhanced since other well-known additives may be added to the primary treatment to assist settling of solids and filtration, etc. Further, the pyrolysis reactor 16 may be operated in such a fashion as to provide for air or oxygen addition such that burning of the solids may provide substantially, all, if not all, of the energy requirements for the reactor. The relatively pure activated carbon from the pyrolyzer 44 can most efficiently form the required adsorption of impurities in the secondary settler. Very little of the sand and clay, (less than 10%) which causes the large amount of ash in the output of the pyrolyzer 16, are carried over to the secondary settler, but they do settle out in the primary settling stage.

Because of the low buildup of ash the output of the pyrolyzer 44, the recycled ash concentration being on the order of 20% rather than 50% or better as it is in the output of the pyrolysis reactor 16, some of the output from the pyrolyzer 44 may be used to make up the deficient amount of carbon applied to the contactor 10. Also the recycling of the pyrolyzer 44 output can occur many more times than possible heretofore before exhaustion of the carbon occurs. By maintaining separation in the pyrolyzation in the sludges from the first and second settlers whereby the ash concentration in the output of the pyrolyzer 44 is substantially minimal, the amount of carbon that would otherwise have to be added to minimized and also the total quantities of solids material being processed by the pyrolyzers is reduced and thus efficiency in the energy requirement is achieved even though the two streams of solids are being pyrolyzed separately.

While this invention has been shown and described as using two separate pyrolysis reactors for maintaining the isolation of the sludges, and the pyrolysis products, it will be quite obvious to those skilled in the art that a single time shared pyrolysis reactor may also be used, if desired, without departing from the spirit of this invention or the scope of its claims.

There has been accordingly described and shown here and above a novel and improved system for treating raw sewage.

We claim as our invention:

1. In a method for treatment of raw liquid waste wherein the raw liquid waste includes water in which organic and inorganic matter is dissolved and which contains suspended matter, wherein the raw liquid waste is first mixed with activated carbon and ash, this mixture is then introduced into a primary settling tank for settling the suspended matter as a primary sludge, the effluent from the first settling tank being mixed with activated carbon and ash, which mixture is then supplied to a secondary settling tank to permit the settlement of a secondary sludge therein, the primary and secondary sludges being de-watered and supplied to a pyrolyzer to be formed into the activated carbon and ash mixed with the raw liquid waste and effluent, the improvement comprising separately pyrolyzing the primary sludge and the secondary sludges to form separate quantities of activated carbon and ash, mixing the activated carbon and ash derived by pyrolysis of the primary sludge with the raw liquid waste, and mixing the activated carbon and ash derived by pyrolysis of the secondary sludge with the effluent from the first settling tank.

2. In a system for treatment of raw liquid waste wherein the raw liquid waste includes water in which organic and inorganic matter is dissolved and which contains suspended matter, wherein the raw liquid waste is first mixed with activated carbon and ash, this mixture is then introduced into a primary settling tank for settling the suspended matter as a primary sludge, the effluent from the first settling tank being mixed with activated carbon and ash, which mixture is then supplied to a secondary settling tank to permit the settlement of a secondary sludge therein, the primary and secondary sludges being de-watered and supplied to a pyrolyzer to be formed into the activated carbon and ash mixed with the raw liquid waste and effluent, the improvement comprising means for separately pyrolyzing the primary and secondary sludges to form separate quantities of activated carbon and ash, means for mixing the activated carbon and ash derived by pyrolysis of the primary sludge with the raw liquid waste, and means for mixing the activated carbon and ash derived by pyrolysis of the secondary sludge with the effluent from said first settling tank.

3. In a system as recited in claim 2 wherein said means for separately pyrolyzing the primary and secondary sludges comprises a first pyrolyzing reactor to which only the primary sludge is applied for pyrolysis, and a second pyrolyzing reactor to which only the secondary sludge is applied for pyrolysis.

4. In a raw liquid waste treatment system of the type wherein the raw liquid waste is mixed with activated carbon and ash which is then allowed to stand in a primary tank for a predetermined period to permit settlement of settleable matter as a primary sludge, the effluent is then removed from said primary tank, is mixed with activated carbon and ash and allowed to stand for a predetermined time in a secondary tank until a secondary sludge settles down, an improvement comprising a first pyrolyzing reactor, means for applying said primary sludge to said first pyrolyzing reactor to produce primary activated carbon and ash means for mixing said primary carbon and ash with said raw liquid waste, a second pyrolyzing reactor, means for applying said secondary sludge to said secondary pyrolyzing reactor to produce secondary activated carbon and ash, and means for mixing said secondary carbon and ash with said effluent from said primary tank.

* * * * *

UNITED STATES PATENT OFFICE
CERTIFICATE OF CORRECTION

PATENT NO. : 3,994,804
DATED : 11-30-76
INVENTOR(S) : JOHN J. KALVINSKAS AND WILLIAM A. MUELLER

It is certified that error appears in the above-identified patent and that said Letters Patent are hereby corrected as shown below:

column 2, line 50, between "slurry and fed" insert --is-- column 2, line 63, between "cakes and are" insert --which-- column 3, line 3, between "carbon and may" insert --monoxide-- column 4, line 11, instead of "to" insert --is--

Signed and Sealed this

Eighth Day of February 1977

[SEAL]

Attest:

RUTH C. MASON
Attesting Officer

C. MARSHALL DANN
Commissioner of Patents and Trademarks